US008838081B2

(12) United States Patent
Spence et al.

(10) Patent No.: US 8,838,081 B2
(45) Date of Patent: Sep. 16, 2014

(54) MOBILE DEVICE APPLICATIONS FOR COMPUTER-TELEPHONY SYSTEMS

(71) Applicant: Nuance Communications, Inc., Burlington, MA (US)

(72) Inventors: Adam Spence, North Sydney (AU); Michael Dunbar, Toogoolawah (AU); Adam Cowls, The Gap (AU); Michael Steinmann, Karingal (AU)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/171,555

(22) Filed: Feb. 3, 2014

(65) Prior Publication Data

US 2014/0146959 A1 May 29, 2014

Related U.S. Application Data

(63) Continuation of application No. 13/424,093, filed on Mar. 19, 2012, now Pat. No. 8,666,378.

(51) Int. Cl.
*H04M 3/51* (2006.01)
*H04M 3/523* (2006.01)
*H04M 1/253* (2006.01)
*H04M 1/00* (2006.01)
*H04M 1/725* (2006.01)

(52) U.S. Cl.
CPC ........... *H04M 3/5183* (2013.01); *H04M 1/006* (2013.01); *H04M 3/5166* (2013.01); *H04M 1/72519* (2013.01); *H04M 3/5231* (2013.01); *H04M 3/51* (2013.01); *H04M 1/2535* (2013.01)
USPC ...................... 455/415; 375/265.09

(58) Field of Classification Search
USPC .............................. 455/414.1–417, 428, 445; 379/142.01–142.18, 210.01–218.02, 379/221.14, 266.01–266.09
See application file for complete search history.

(56) References Cited

U.S. PATENT DOCUMENTS

| 5,644,629 | A | * | 7/1997 | Chow ....................... 379/142.07 |
| 7,353,016 | B2 | | 4/2008 | Roundtree et al. |
| 7,539,484 | B2 | | 5/2009 | Roundtree |

(Continued)

FOREIGN PATENT DOCUMENTS

| EP | 1087596 A2 | 3/2001 |
| WO | WO-0163894 A2 | 8/2001 |
| WO | WO-2008002705 A2 | 1/2008 |
| WO | WO-2009079252 A1 | 6/2009 |
| WO | WO-2009099613 A1 | 8/2009 |
| WO | WO-2011081796 A1 | 7/2011 |

OTHER PUBLICATIONS

"3GPP TS 29.199-3 V6.3.0 Technical Specification", 3rd Generation Partnership Project, 2006, 19 pages.
"ETSI Parlay X 2.1 S—Part 3 Call Notification", http://docbox.etsi.org/tispan/open/osa/parlayx21.html, 1 page, internet accessed May 22, 2012.
Genesys Telecommunications Laboratories, Inc., "Genesys Platform SDK 8.0 Deployment Guide", 42 pages; 2009.

*Primary Examiner* — Kashif Siddiqui
(74) *Attorney, Agent, or Firm* — Perkins Coie LLP

(57) ABSTRACT

On a mobile telecommunications device, computer-executable code executes to facilitate interactions between the user of the mobile telecommunications device and a call center or other computer-telephony integration equipment. The computer-executable code includes instructions that request at least one operation to be performed at a call center, where the call center includes a call center controller, an interactive voice response system component, and at least one agent. At least in part, a wireless network transmits the request from the mobile telecommunications device to the call center controller.

20 Claims, 12 Drawing Sheets

(56) References Cited

U.S. PATENT DOCUMENTS

| | | |
|---|---|---|
| 7,676,221 B2 | 3/2010 | Roundtree et al. |
| 2002/0196929 A1 | 12/2002 | Smith et al. |
| 2004/0121814 A1 | 6/2004 | Creamer et al. |
| 2005/0152522 A1 | 7/2005 | Kumhyr |
| 2007/0156846 A1* | 7/2007 | Seward .................. 709/219 |
| 2010/0087175 A1 | 4/2010 | Roundtree |
| 2010/0091971 A1* | 4/2010 | Famous .................. 379/210.01 |
| 2011/0019812 A1* | 1/2011 | Sankaranarayanan ... 379/266.01 |
| 2011/0069828 A1 | 3/2011 | Erhart et al. |

* cited by examiner

| | Caller Identification Entries 322 | Caller Authentication Entries 324 | Caller Context Entries 326 | Call Routing Entries 328 |
|---|---|---|---|---|
| 710 | [MSISDN] 206-555-1212  712 | | | "Upgrades"  718 |
| 720 | [MSISDN] 206-555-1212  712 | | "Callback requested at: 8:34PM"  726 | "Upgrades"  718 |
| 730 | [MSISDN] 206-555-1212  712 | | "Pushed URL: http://shop.vector.com/all-plans?id=900013"  736 | |
| 740 | [IMEI] 353955802-121326-9  742 | "Account: 95841321", "Password Verified"  744 | | |
| 750 | [IMEI] 353955802-121326-9  742 | "Account: 95841321", "Password Verified"  744 | | "x208"  758 |
| 760 | [IMEI] 353955802-121326-9  742 | "Account: 95841321", "Authentication Required"  764 | "Product purchase attempt failed due to expired credit card on record"  766 | "x208 or x209"  768 |
| 770 | [IPV6] fe80:0:0:0:200:f8ff:fe21:67cf  772 | | Process fault information: 0x8fea0120 0x3300cc0f ..."  776 | "Technical Support"  778 |

*FIG. 7*

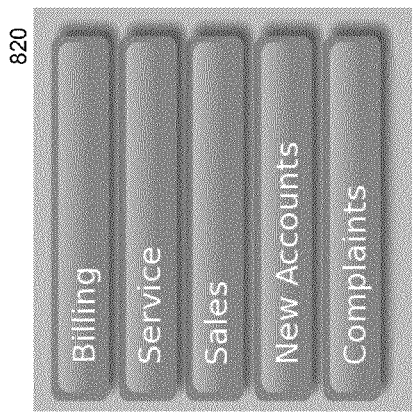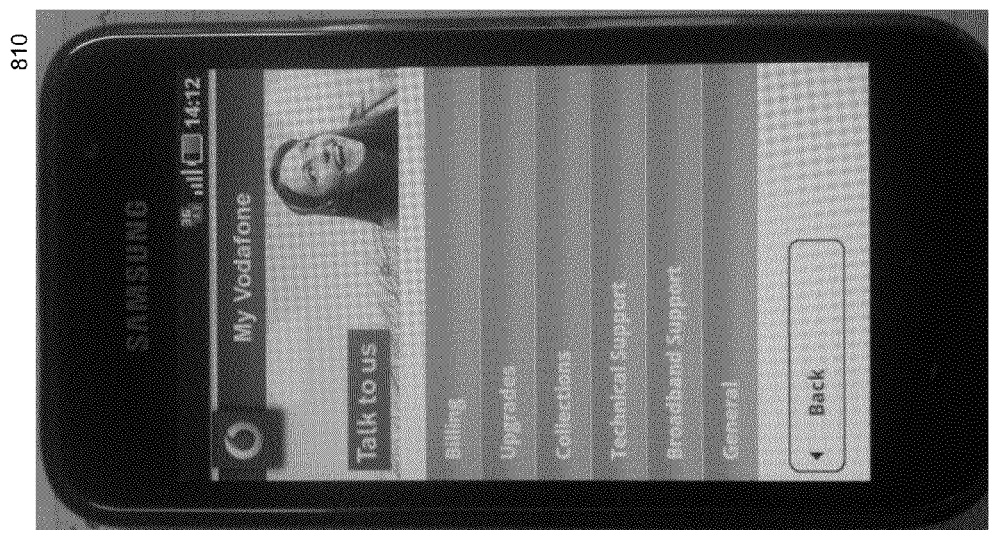
FIG. 8

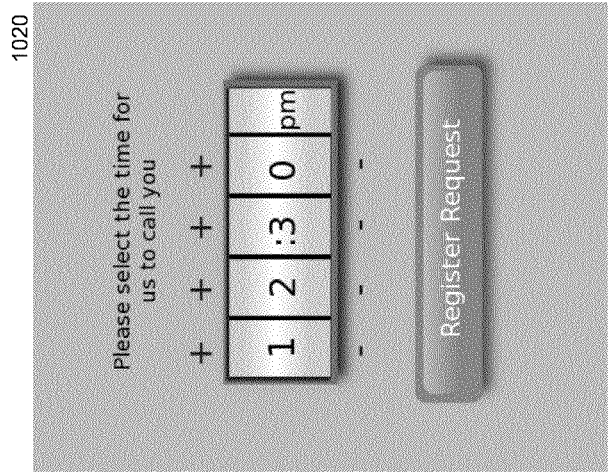
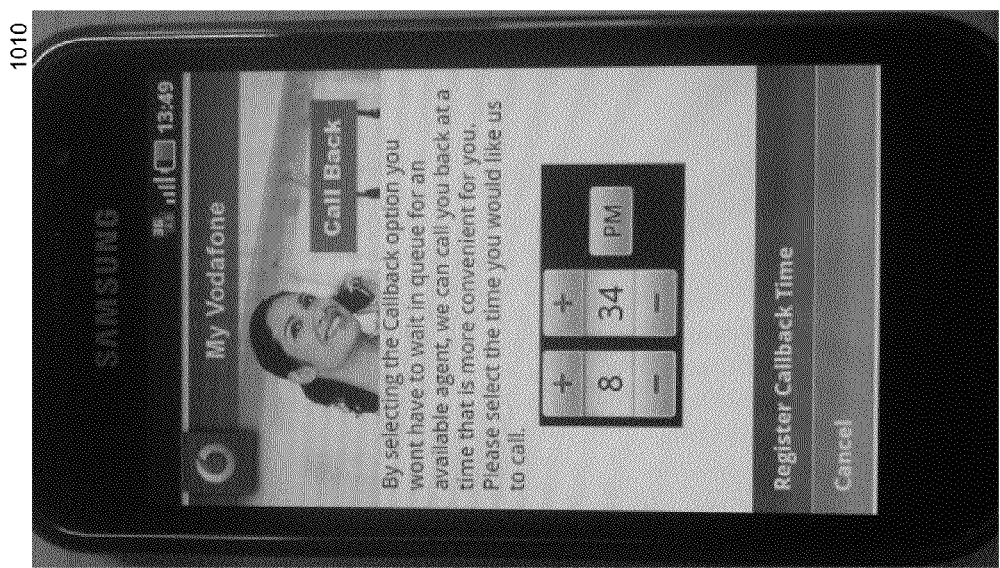
*FIG. 10*

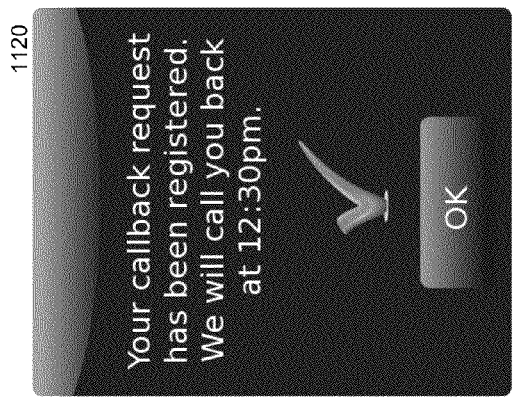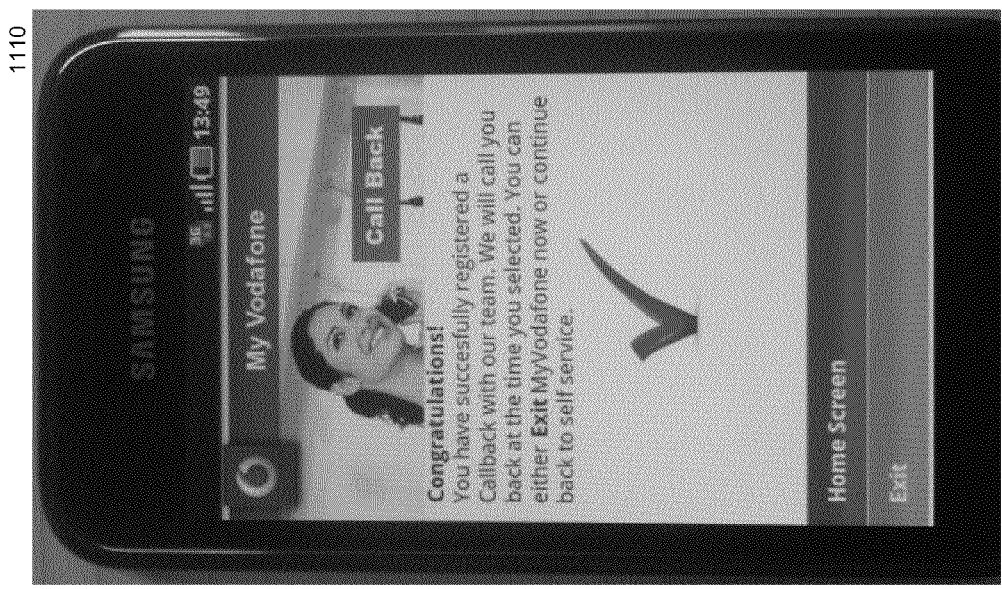
FIG. 11

MOBILE DEVICE APPLICATIONS FOR COMPUTER-TELEPHONY SYSTEMS

CROSS-REFERENCE TO RELATED APPLICATIONS

This application is a continuation of U.S. patent application Ser. No. 13/424,093, filed on Mar. 19, 2012, entitled "MOBILE DEVICE APPLICATIONS FOR COMPUTER-TELEPHONY SYSTEMS", which is incorporated herein by reference in its entirety.

BACKGROUND

Often times, telecommunication device users become frustrated when interacting with call centers. For example, users may be forced to navigate through tedious menus from interactive voice response ("IVR") systems, during which a pre-recorded, or computer synthesized voice may, rather impersonally, ask a variety of annoying questions of the user. A user typically can respond to the questions orally, or alternately by pressing numeric buttons on the keypad of the telephone in order to cause the telephone to emit, via the audio communications channel, one or a sequence of dual-tone multi-frequency ("DTMF") tones for recognition by the IVR system. Problems commonly arise during both modes of communication.

One problem arises during DTMF tone production, when the user has a keypad with a nonstandard mapping of letters to numbers. For example, if the IVR system is designed for the letter mapping of a standard keypad (where, for example a single key corresponds to the number 2 as well as the letters "A", "B", and "C"), the user of a phone with a keypad having a different letter mapping may experience difficulty, as a different DTMF tone (or no tone at all) may be produced when the user presses the desired key to be communicated to the IVR.

Other problems arise when a user attempts to interact with a call center orally in a noisy environment, such as near automobile traffic, where loud music is playing, or nearby other people talking at loud volume levels. In such situations, background noise can overwhelm the user's verbal responses to an IVR system, making proper recognition of the user's utterances difficult, if not impossible. This same problem can afflict human call center agents who attempt to interact with the user orally. Moreover, the user can experience difficulty in listening to the audio-based information in a noisy environment. These problems can lead to the user repeatedly and unsuccessfully attempting interactions with the call center, not being able to interact in a convenient or timely manner, and experiencing dissatisfaction and frustration.

When human agents are employed to verbally dialogue or interact with the user rather than utilizing IVR interactions, the costs of the employer generally increase, and this approach will not solve all the problems. In some cases where an agent is instructed to read predetermined scripts to a user that an IVR could have been programmed to read, a poor and impersonal user experience can result. An IVR system or a human agent may needlessly ask a user questions and waste the time of the user. For example, a user may spend minutes navigating through the initial questions or menus of an IVR system, during which time the IVR system may verbally present various information that the user either already knows or does not care about, such as when the information is not relevant to the situation of the user. Typically, an IVR or a human agent knows little about the context of an incoming caller when the voice connection is recently established. The IVR system or agent may not initially know the likely reason that the user is calling about, or even information about the identity of the caller, whether the identity of the caller really is who the caller says, and so on. Furthermore, agents working at a call center may be divided by, or assigned to, groups able or preferred to perform specific tasks or work with specific users. The user is typically initially verbally queried to determine more information about the context of the user, (such as the nature of the user's need), before the user's voice call is transferred to an agent more capable of satisfying the user.

In order for certain transactions to be made with the assistance of a call center, a caller may also be asked to verbally prove their identity by providing authentication information, which can include information such as the user's address, the user's partial or full social security number, an account password, and other security verification questions. Some IVR systems or agents may require, such as for security purposes, that the user provide account identification and authentication information initially before any substantive problem solving can begin. In some cases, the call center requests account information in order to track the history of the interactions with a customer, for example with customer relationship management ("CRM") software. Asking for and orally proving the identity of customers takes the customer's time and also incurs increased risks of misuse of the security authentication information, such as by a third party overhearing the user uttering security information, or by the human agent misusing the authentication information (e.g., performing identity theft with the user's address and social security number).

Call interception technology has alleviated certain problems of interacting with call centers; but even with call interception techniques on a mobile device, there still can exist the above-mentioned user frustrations when connection to an IVR system or agent becomes required in order to address the user's need. The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description

BRIEF DESCRIPTION OF THE DRAWINGS

FIG. 7 contains example data structures that associate caller identification, caller authentication, caller context, and call routing.

FIG. 8 contains examples of a user interface display and a related widget that allow a user to select from various groups of agents at a call center.

FIG. 10 contains examples of a user interface display and a related widget that allow a user of a mobile device to schedule a time to receive a call from an agent at a call center.

FIG. 11 contains examples of a user interface display and a related widget that confirms a scheduled time for receiving a call from an agent at a cell center.

DETAILED DESCRIPTION

Figure 1:
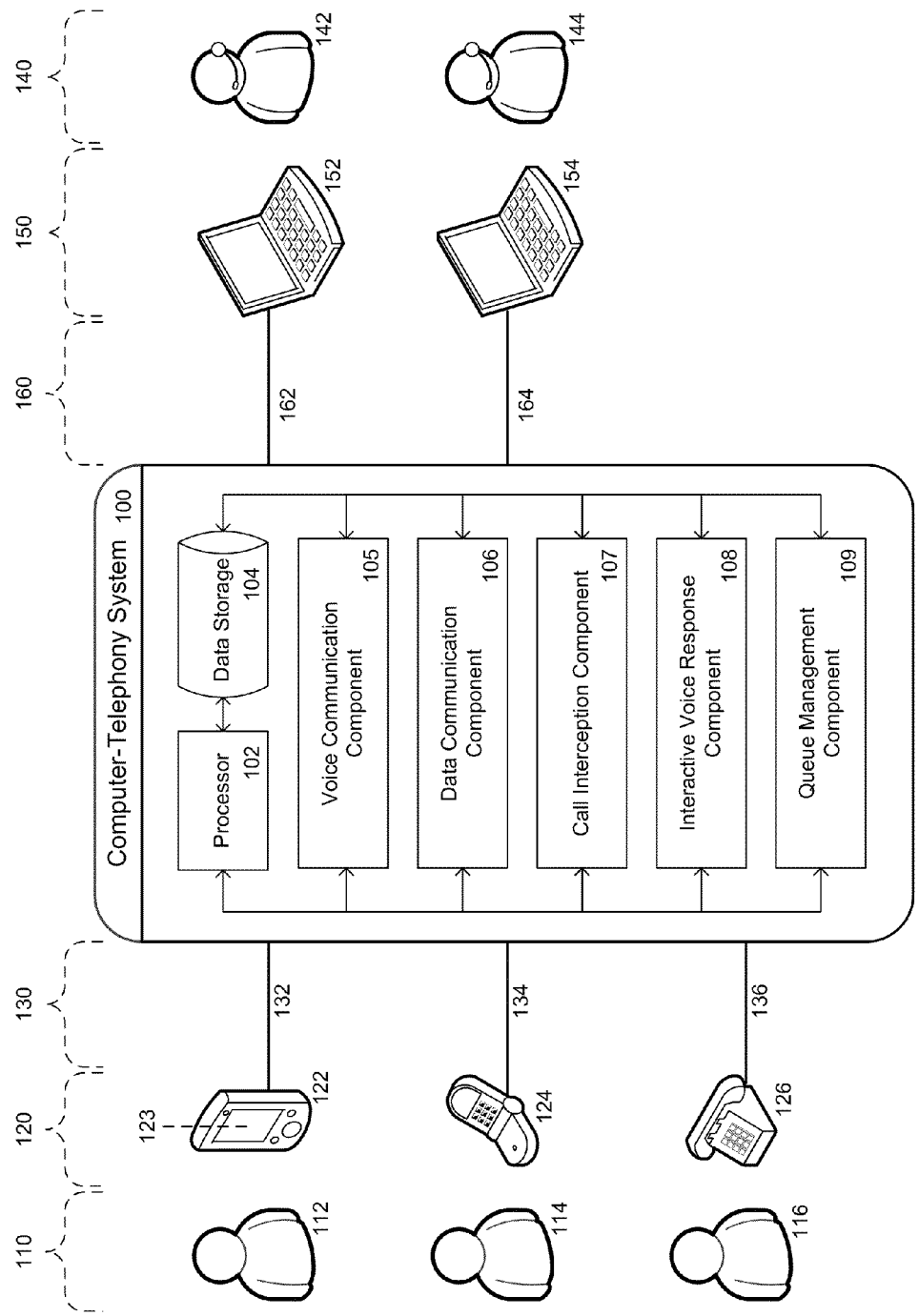
FIG. 1 is a system diagram of a computer-telephony system for providing assistance to a user of a mobile device.

In various embodiments, the technology facilitates interactions between the user of a mobile telecommunications device and a call center in order to help the user avoid interacting with an IVR system or waiting on hold for a long period of time during a voice call before being able to speak to a human agent, or to streamline or eliminate some of the oral interactions during a voice call with a human agent that are necessary to resolve the user's problem or request. The facilitation may include one or more of: displaying call center availability information on the graphical user interface of the mobile device, scheduling a call with the call center for origination at a future time, sending routing instructions for routing a call to a particular agent or group of agents at the call center, and displaying or processing on the mobile device information sent by a call center agent via the call center agents terminal.

In some aspects, the mobile device receives a message from a mobile care server or a call center controller that contains call center availability information. The mobile device may present the availability information to the user on the graphical user interface of the mobile device in order to allow the user to make an informed decision as to whether or not to make a voice call to the call center. In some cases, the graphical user interface of the mobile device only recommends, suggests, or encourages its user to make a call only when the message indicates that the call center is available. The availability information for the call center may include availability information that is specific for a particular agent or group of agents at the call center. The user may perform a particular action on the mobile device that causes the mobile device to request the availability information or presents the availability information, such as opening an application on the mobile device, making a particular menu selection within an application or operating system, encountering a particular technical problem detected by the mobile device, or dialing a phone number for the call center that is intercepted.

In some aspects, the mobile device sends at least one of call routing, call scheduling, and call data attaching instructions to a call center. Call routing instructions instruct the call center to route a phone call received from or originated to the mobile device to a particular agent or group of agents at the call center. Call scheduling instructions instruct the call center to originate a phone call to the mobile device at a particular time in the future. Call data attaching instructions instruct the call center to display information relating to the context, identification, or authentication of the caller on the terminal of the agent who gets routed the voice call of the mobile device, so that the agent can provide an improved user experience to the user during the user's voice call.

A system, described in detail below, facilitates interactions with computer telephony integration (CTI) equipment. A software SDK can permit connectivity to server-based components that in turn interface with a gateway server or CTI resources. For example the system provides information appearing on the display of a call center agent's terminal, such as the context of a caller who is routed to the agent. The agent may see if the user was, prior to initiating a call, using a menu of the help application to obtain technical support information. In another example, the agent sees that a user has already provided account login or authentication information into a graphical user interface of the user's mobile telecommunications device. Accordingly, the call center agent may not need to orally ask for authentication information during a phone call with the user, thereby saving time of the agent and the user.

The system may automatically display information relating to a caller on an agent's computer screen, such as information relating to the caller's account, the caller's mobile device, the caller's billing information, the history of recent interactions with the caller, other customer relationship management ("CRM") information for the caller, diagnostic information about the caller's mobile device, the likely reasons for which the caller may be calling (or suggested answers to likely questions), and so on.

The system may also store or receive information that a caller or potential caller's phone has recently experienced an unexpected malfunction, and it may subsequently display related information on an agent's computer monitor, along with suggested remedies that the agent or the customer may take to fix the malfunction, or prevent it from happening again. For example, the agent may instruct the customer to perform an action on the customer's phone, or the agent may remotely control the customer's mobile device while the agent and the user remain on the phone. Alternately, the agent may remotely issue commands to the mobile device, such as by remotely installing a "bug fix" for problematic software, which the system determined was likely responsible for the crash.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.
Suitable System FIG. 1 is a system diagram of a computer-telephony system for providing assistance to a user of a mobile device. A computer-telephony system 100 is communicatively coupled via communication links 130 to telecommunication devices 120 used by end users 110. Some telecommunication devices 120 are mobile telecommunication devices, e.g., a smart phone 122, a cell phone 124, and a wired or cordless phone 126 (used by users 112, 114 and 116, respectively). The system 100 is also coupled to agent terminals 150 (for human agents 140) by the communication linkages 160. The system 100 may include or be communicatively coupled with other users, telecommunication devices, agents, agent terminals, communication linkages, and so on, which are not illustrated in FIG. 1.

The smart phone or mobile device 122 illustrated has a graphical user interface 123, such as, but not limited to, a capacitive touchscreen panel or a liquid crystal display ("LCD") in combination with hardware buttons, and the like. Other telecommunication devices, such as the devices 124 and 126, may have different user interfaces than the user interface 123. For example, the cell phone or mobile device 124 may have a smaller display (e.g., fewer pixels or a smaller dimensioned screen.) The telecommunication device 126 may have a non-graphical user interface (e.g., consisting of touchpad buttons, a microphone, a ringer, and a loudspeaker, and no display.)

The communication connections or linkages 130 with the mobile and telecommunication devices include a combination of wireless communication linkages 132 and 134, and wired communication linkages, such as the communication linkage 136. Each of the communication linkages 130 support voice-based telecommunications, such as over a public-switched telephone network ("PSTN"). For example, communication linkage 136 may traverse a "plain old telephone service", and communication linkages 132 and 134 may traverse wireless telecommunication networks; e.g., a cellular network such as a Global System for Mobile Communications network ("GSM"), a Code Division Multiple Access ("CDMA") network, 3G/4G network, an IEEE 802.11 or 802.16 family network (such as a "WiFi" or "WiMAX" network), a satellite communications network, and so on. Some or all of the communication linkages 130 also support the transmission of data. For example, the communication linkage 132 may support the transmission of data over a wired and/or wireless telecommunication network via any one or a combination of the following techniques: short messaging service ("SMS") including binary SMS; General Packet Radio Service ("GPRS"), 3GPP long-term evolution ("LTE"), Internet Protocol ("IP"), Hypertext Transport Protocol ("HTTP") or HTTPS, Session Initiated Protocol "SIP", and any other techniques known in the art for delivering data across wired or wireless networks.

The computer-telephony system 100 includes a processor 102 coupled to data storage 104. The data storage 104 may be any one or a combination of a hard drive, random access memory ("RAM"), flash memory, read-only memory, a memory cache, and any other data storage device known in the art. In various embodiments, the processor component 102 may be implemented by a single processor on a single computing device, multiple processors on a single computing device, or by multiple processors on multiple computing devices (such as on various combinations of the telecommunication devices 120, laptop or desktop computers comprising agent terminals 150, server computers, main frames, networking routers, gateways, switches, and so on.) The processor 102 and the data storage 104 may be communicatively coupled with one or more components of the system 100, such as a voice communication component 105, a data communication component 106, a call interception component 107, an IVR component 108, and a queue management component 109.

The voice communication component 105 may answer phone calls, originate phone calls, and route phone calls processed by the computer-telephony system 100. For example, the voice communication component 105 may answer a phone call received from the user 112 of the mobile device 122 and route it to the IVR component 108 or to one of the agents 140. The voice communication component 105 may receive instructions, such as routing instructions, and send messages, such as a call routing alerts. The data storage 104 may store the received routing instructions. In some embodiments, the voice communication component 105 comprises a telephone exchange or telephone switch, such as a private branch exchange ("PBX"), or a session initiation protocol ("SIP") switch, such as may be used for VoIP or video calling.

The data communication component 106 may communicate data within and beyond the computer-telephony system 100, including the communication of messages with mobile device 122 across communication link 132, and in some cases the communication of data with agent terminal 152 and 154 via communication link 162, and 164, respectively.

In some embodiments, upon receipt from the voice communication component 105 of an alert that an incoming call exists from a telecommunication device (e.g., the mobile device 122), the call interception component 107 may instruct the voice communication component 105 to terminate the voice call and instruct the data communication component 106 to send data communications to the mobile device 122 over communication link 132 in order to intercept the call from the user 112 and provide, via the graphical user interface 123, interactive and immediate visual-based assistance to the user. By intercepting the voice call, the user 112 may be able to immediately resolve a request for assistance in a manner that is both more effective than orally communicating with the IVR component 108, as well as more immediate than waiting for the agents 140, when they are occupied, to become available. In some embodiments, the system 100 utilizes the IVR component 108 to, at times, provide automated, voice-based service to one or more users 110 of the telecommunication devices 120, such as, for example, when the agents 140 are unavailable, or when the user's 116 device 126 does not have a suitable user interface 123 for providing visual assistance on the device. The system 100 may therefore provide compatibility with a wide variety of telecommunication devices 120.

In order to provide the users 110 with fair, time-effective, cost-effective, and predictable access to the call-center agents 140, (who may, at times be unavailable, e.g., busy helping other users), the system 100 may utilize a queue management component 109. The queue management component 109 may for example, provide visually-displayable status information to the mobile device 122 about the number of callers who are already waiting to speak to one of the agents 140. Status information may include the number of callers interacting with the IVR component 108 (e.g., who may have already requested, or who may soon request to speak to an agent), the number of users who are waiting in a queue for the system 100 to call the user back (e.g., when the queue management component 109 determines it is the user's turn to speak to an agent) and the like. The queue management component 109 may consider a user who is waiting on hold (including, in some cases, interacting with the IVR component 108) as being in the queue.

The mobile device 122 may execute computer-executable code to notify its user 112 via its graphical user interface 123 regarding the status of the call center, such as notifying the user about how many other callers are already waiting in the queue, or about the time that the system anticipates that the user 112 must wait before being able to speak to an agent. In some embodiments, the notification is simply a suggestion or a menu option (of the lack thereof) that is displayed on the graphical user interface 123 that suggests that the user may wish to immediately speak to a currently available agent. The graphical user interface 123 may prompt its user 112 for making a call, entering a waiting queue or scheduling a time for a future call. In some embodiments, the queue management component 109 considers a subset of the agents at the call center 140 when determining availability, estimated wait time, or waiting caller queue length. The subset of the agents at the call center 140 may be, for example, a particular agent who may be assigned to the user, a particular group of agents who are best able to address the need of the user, and so on.

Figure 2:
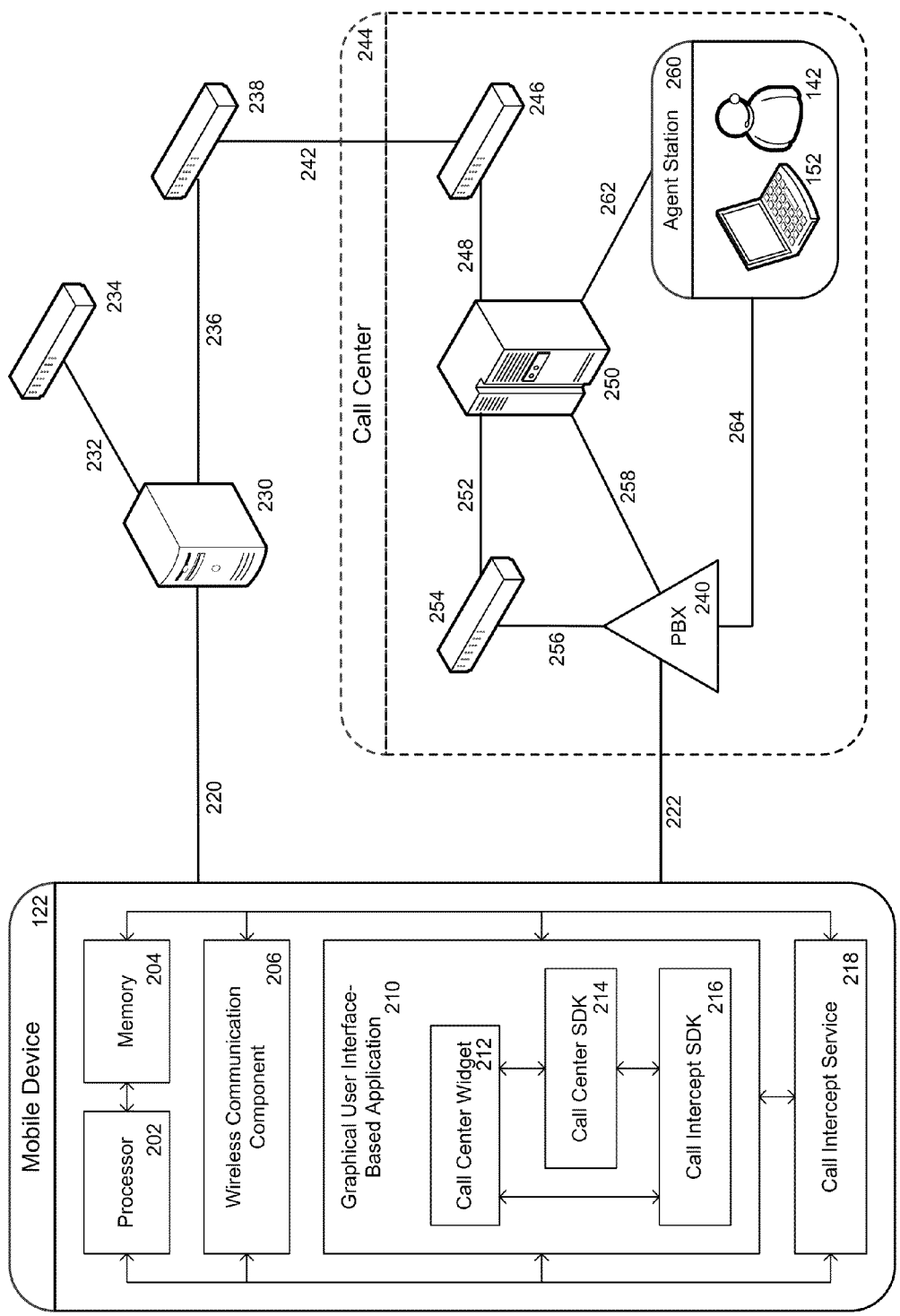
FIG. 2 is a system diagram illustrating additional details of the computer-telephony system of FIG. 1.

FIG. 2 is a system diagram illustrating additional details of the computer-telephony system of FIG. 1 for at least one embodiment of the invention. The mobile device 122 includes at least one processor 202 and memory 204, the graphical user interface 123, and a wireless communication component 206. The processor 202, the memory 204, the graphical user interface 123, and the wireless communication component 206 in some embodiments are interconnected via a system bus.

The wireless communication component 206 may wirelessly transmit and receive information, such as analog voice communications or digital packet information, across a wireless network to another party. The wireless communication component 206 may utilize a modem, a radio, and an antenna for implementing various short, medium, or long range wireless communication techniques known in the art. The wireless communication component 206 may provide both voice communications, such as cellular telephone service, and data communications, such as packet data.

The memory 204 may be any one or a combination of the aforementioned storage devices referenced in the description of the data storage 104 (e.g., RAM, or flash memory.) The memory 204 may contain data and computer-executable instructions, which may be executed by the processor 202. The data and computer-executable instructions may implement operating systems and application programming interfaces ("APIs") for interfacing with the operating systems, or other libraries, such as may be provided or compiled by software development toolkits "SDKs". APIs and SDKs facilitate the development and maintenance of software or firmware widgets, applications, and other code. An operating system contained in the memory 204 may include one that is open to third-party application development (i.e., has APIs available for independent software vendors to utilize when writing code, examples including Apple iOS, Google Android, Microsoft Windows phone or Windows Mobile, and Symbian operating systems), or one that is not open to third-party application development (such as may be found on a feature phone.)

In various embodiments, portions of the computer-executable code facilitate interactions between the user 112 of the mobile device 122 and a call center (e.g., the call center 244), the computer-executable code comprising instructions that request at least one operation to be performed at the call center. The mobile device 122 may include a graphical user interface-based application 210, which utilizes the graphical user interface 123, and that may provide functionality to assist the user to perform tasks related to the call center 244, such as performing a bank transaction (e.g., with the call center offering support to customers of a bank), troubleshooting problems (e.g., technical device problems could be supported by a call center related to the manufacturer of the mobile device 122 or to the wireless service provider), receiving other customer support, and so on.

One or more widgets, callable by a third party software application or operating system, may be utilized to perform operations relating to the system 100. The widgets may have customizable features. The graphical user interface-based application 210 may include or utilize any one or more of: a call center widget 212, a call center SDK 214, and a call intercept SDK 216. The call center widget 212 facilitates providing functionality relating to a call center (e.g., facilitating the development and maintenance of the application 210.) In addition to, or instead of utilizing the call center widget 212, the application 210 may directly utilize the call center SDK 214 and the call intercept SDK 216. The call center widget 212 may also utilize the SDKs 214 and 216. The call intercept SDK 216 provides (e.g., to the application 210) call intercept methods and functionality. Some call intercept methods and functionality are detailed in U.S. Pat. No. 7,353,016, entitled "Call Intercept Methods, Such as for Customer Self-Support on a Mobile Device", dated Apr. 1, 2008, as well as in U.S. Pat. No. 7,676,221 of the same title, dated Mar. 9, 2010. See also U.S. Pat. No. 7,539,484, entitled "Method and System for Enhancing Voice Calls, Such as Enhancing Voice Calls with Data Services" dated May 26, 2009. The contents of the above three patent references are hereby incorporated in their entireties.

The mobile device 122 may also contain a call intercept service 218 available for widgets, applications, or an operating system thereon to utilize, e.g., via the call intercept SDK 216. A service on the mobile device 122, (such as the call intercept service 218), may be memory resident (e.g., loaded into RAM, and available for execution) or running in the background (e.g., to receive messages) after the mobile device 122 has been successfully turned on and booted. For example, the call intercept service 218 may be loaded into RAM and ready to run even when the application 210 is not running. In some cases, services, such as the call intercept service 218, run in a separate execution thread or process. The call intercept service 218 may in some embodiments receive messages, execute instructions, trigger the graphical user interface-based application 210 to load into memory or execute, and so on, even when the user is not actively using (e.g., not observing via the graphical user interface 123) the graphical user interface-based application 210. For example, when the user is using a "phone number dialer" or "phone contacts" application of the operating system, and dials a number, in some cases the operating system may trigger the execution of configured functions or code entry points of the call intercept service 218. In some embodiments, call interception may alternately or additionally trigger the launching and executing of the graphical user interface-based application 210. In some embodiments, other triggers or messages provided by the operating system (for example, a notification about the creation or modification of a particular file or configuration parameter at a particular location, such as a file directory location) may execute portions of the call intercept service 218.

The SDKs 214 and 216 each contain at least one application programming interface ("API") for sharing data with, receiving calls from, and making calls to, the operating system, applications (e.g., the graphical user interface-based application 210), services (e.g., the call intercept service 218) and widgets (e.g., the call center widget 212.) An API may be in any variety of suitable formats and languages, such as XML, C++, C#, Objective C, Java Script, and so on. Example API calls for the call center SDK 214 are indicated in Table 1.

TABLE 1

| API Call | Description |
| --- | --- |
| registerSession(MSISDN, p1, p2, pn) | May be used to establish a session between the user and the computer-telephony environment. p1, p2, . . . pn may indicate parameters used or required for the session. An identifier, such as an MSISDN of the user's account, an IMEI of the user's phone, or an IMSI of the Subscriber Identity Module ("SIM" card), and so on, may be used to identify the user (e.g., the user's mobile equipment or an account that is associated with the user, such as the user's wireless subscription account, some other identifier associated with the user, etc.) |
| attachData(MSISDN, key, value) or SetKVP( ) | To save ("attach") one or more key/value pairs associated with a session (which may be indicated by the MSISDN). |
| getStats( . . . ) | Gets one or more statistic or data associated with the computer-telephony system (see examples herein). |
| getStats(__QUEUE__WAIT__TIME__), getStats(__CALL__CENTER__OPEN__), or getStats(__PERSONAL__ACCOUNT__MANAGER__AVAILABLE__) | May be used to obtain the current queue wait time, the current general availability of a call center (e.g., if the call center is currently staffed and open and not closed for a holiday, or, as another example, if the call center has any available agents ready to take a call), and whether a user's personal account manager assigned to that user is available (e.g., respective to the example API calls herein.) |
| getKVP(key) | May be used to retrieve a key/value pair previously attached (may be saved, e.g., previously attached by the mobile device during this session, during another session, or previously to this session, by a call center agent such as during a data push operation, or by the IVR system, etc.) |
| requestTransferDNIS(partyIdentifier) | May indicate a desire for voice communications with a particular agent, group of agents, or interactive voice response (IVR) system at a call center. In one embodiment, partyIdentifier may identify the desired called party. The function make take an indication of which agent, group of agents, or IVR system is desired to be communicated with as an input, and may return a phone number as an output, which the user's device may call. In some embodiments, upon calling the number, Dialed Number Identification Service ("DNIS") may be utilized, optionally along with the caller's identification, to identify the desired routing that the system should utilize for the call. In an alternate embodiment, calling the function may cause the mobile device to automatically dial the desired number associated with the identifier. |
| requestCallBack( ) | May be utilized to have the call center call the user (i.e., perform a voice call directed to the user or the user's mobile device) at a later time. May utilize attached data for scheduling the call (or, may take the appropriate data as an input argument, e.g., a specific time and/or date to schedule the call). |
| queryCallBack( ) | May be utilized to determine the status of previously scheduled call back requests. For example, may indicate whether a call back is pending (such as one that has been scheduled, for which the user is currently waiting to receive.) Alternatively or additionally, may indicate if a callback was unsuccessfully scheduled (e.g., if the time for which a previously requested callback was requested is not estimated to be available.) Alternatively or additionally, may indicate the availability of the computer-telephony system for call backs. For |

TABLE 1-continued

| API Call | Description |
| --- | --- |
| | example, the function may return at least one specific time at which the system anticipates becoming available to call the user or, alternatively, an estimated wait time or length of a queue indicating an estimate of when the call center will become available for a voice call. |

The communication linkage 132 may comprise a data connection 220 and a voice connection 222. The data connection 220 connects the mobile device 122 to the data communication component 106, and the voice connection 222 connects the mobile device 122 to the voice communication component 105 of the computer-telephony system. The data connection 220 may implement the data communication component 106. For example, in some embodiments, a mobile care server 230 uses the data connection 220 in order to exchange data between the mobile device 122 and any portions of the call interception 107, the IVR 108, and the queue management 109 components that the mobile care server 230 may implement or relay data communications for. The mobile care server 230 may contain a processor, implementing all or portions of the processor 102. The mobile care server 230 may additionally contain a data storage device (e.g., a hard drive with a relational database) implementing all or portions of the data storage 104.

The call intercept service 218 (or in some embodiments, other executable code residing on the device beside the call intercept service 218, such as the operating system, the call center widget 212, or the application 210) may communicate via the data connection 220 with the mobile care server 230. The mobile care server 230 may cache resources and data, such as applications, widgets, SDKs, other code and data, etc., for distribution to mobile device 122 when the data connection 220 is ready (e.g., when a wireless network that is traversed by the data connection 220 becomes uncongested, or available for utilizing with increases cost-effectiveness.) The data connection 220 may allow the transmission of data using any of the aforementioned data transmission techniques discussed in relation to the communication linkage 132 (e.g. SMS/MMS, IP-based, etc.). Various events on the mobile device may trigger the communication, such as but not limited to: the device being booted, the device being booted for the first time, the user launching an application on the device, and the mobile device intercepting the user's request for an outgoing phone call, access via a web page/displayed screen, and the like.

In some embodiments, the mobile care server 230 utilizes a communication link 232 to communicate with a backend system 234. The backend system 234 may store data, retrieve data, perform actions, and perform transactions (such as financial transactions) at a separate facility, such as at a secured financial transaction processing facility of a bank, or of a wireless service provider, etc.

A network connection 236 allows the mobile care server 230 to communicate with a computer-telephony connector 238. The computer-telephony connector 238 may implement, (or, alternately, may communicate with, such as by a communication link 240) a computer-telephony interface 246 associated with at least one call center (e.g., the call center 244) or with one type of Customer Interaction Management ("CIM") software. In some embodiments, the computer-telephone interface 246 is an application programming interface ("API") for the Genesys platform SDK, version 8.0, and the computer telephony connector is for programmatically extending the Genesys CIM platform, which may be utilized by the call center 244. The Java API of the Genesys platform SDK is further detailed at: http://devzone.genesyslab.com/devportal/80%20SDK%20Documentation/Platform%20SDK%208.0.1%20Java%20API%20Reference.zip.

In other embodiments, the computer-telephony connector 238 may interface with a different type or brand of CIM platform, such as Cisco Intelligent Contact Management software. In some embodiments, multiple connectors 238 will be available for the mobile care server 230 to utilize, allowing for the system to interface with a variety of CIM platforms and call centers, beyond just the call center 244.

Referring back to the example of the call center 244 in FIG. 2, the computer-telephony interface 246 may receive requests from the mobile care server 230, e.g., using an extensible markup language ("XML") protocol and by receiving calls to the aforementioned Genesys platform SDK version 8.0. The computer-telephony connector 238 and the computer-telephony interface 246 may be stand-alone physical devices, or may be logical components of the mobile care server 230 or a computer-telephony controller (such as a call center controller 250 associated with the call center 244.)

In some embodiments, the connections 236, 242 and 248 may include the transmission of data over non-secured networks, such as the internet. In these cases, it is desirable for the communication to be encrypted, or tunneled (such as by using a virtual private network) in order to secure the data. When components reside in different locations (e.g., if the call center controller 250 is in a first location while the mobile care server 230 is in a second location and while the backend system 234 is in a third location), it is desirable for connections between the locations (e.g., connection 232 and connection 242) to transmit data and commands in a manner that maintains security during transit between the locations.

The call center controller 250 also has a connection 252 with a voice browser 254. The voice connection 222 may connect the mobile device 122 with a private branch exchange 240, which may be located within call center 244. Other connections suitable for conveying voice communications, e.g., 256 and 264, may be configured to route the voice connection 222 between the mobile device 122 and the voice browser 254, or to an agent station 260. The private branch exchange ("PBX") 240 may implement the voice communication component 105. The call center controller 250 may, via the connection 258, alter the configuration state of the PBX 240 with respect to how the PBX manages and connects the voice connections 222, 256, and 264. The queue management component 109 may be implemented on at least one of the PBX 240 and the call center controller 250. Using the queue management component 109, the PBX may control telecommunication access to the agents 140 (e.g., agent 142 at station 260), and may likewise, at times, route one or more of the callers 110 to the voice browser 254.

The voice browser 254 may implement the IVR component 108. In one example, the voice browser 254 accesses Voice XML ("VXML") files in order to determine the voice browser's behavior. Additional details may be found in U.S. Patent Publication No. 2010/0087175, dated Apr. 8, 2010, entitled "Methods of Interacting Between Mobile Devices and Voice Response Systems," the content of which is hereby incorporated by reference in its entirety.

The agent station 260 is coupled to the call center controller 250 by a connection 262 that is capable of sending and receiving data to and from the agent terminal 152. The connection 262 may be a private network connection (e.g., Ethernet in a private network), or a public network connection (e.g., an VPN-secured connection traversing a portion of the internet.) The agent station 260 may contain at least one of a headset, a handset, a software-based phone, or another telephonic device suitable for allowing its agent 142 to connect to its voice connection 264. The agent station 260 may additionally include CRM software, CIM platform software related to the call center 244, and other components suitable for interacting with the call center controller 250 and the voice connection 264. For example, Genesys Local Control Agent software may allow the call center controller 250 to monitor and control Genesys applications. The call center controller 250 may detect the responsiveness of Genesys applications in the agent station 260, such as by utilizing "heartbeat" messages. Heartbeat messages determine whether the agent 142 is, or is not, currently connected with the voice connection 264. If the agent 142 is not currently connected, that agent may be considered by the call center controller 250 to be available to take a call.

In some embodiments, the call center 244 may utilize Genesys Virtual Hold Rendezvous to implement at least a portion of the queue management component 109.

In some embodiments, the system 100 identifies a free inbound phone line with a particular phone number, and sends that phone number (e.g., via the connector 238 and the mobile care server 230) to the mobile device 122. The free inbound phone line identification may be performed by checking the status of a list of inbound phone numbers (e.g., the list of phone numbers for the PBX 240, or for the call center 244.)

The call center 244 may utilize Dialed Number Identification Service ("DNIS") in order to determine which telephone number was dialed when a caller (e.g., the mobile device 122) establishes voice connection (e.g., 222) with the PBX 240. The dialed number may in some cases be used by the PBX 240 to identify, at least in part, the caller. For example, multiple dialed numbers may reach the same PBX, and the PBX may determine the identity of the caller based on the dialed number. Alternately or additionally, caller identification, extended dialing digits, or any other identification based on the ITU-T Q.1200 series recommendations ("Intelligent Network") may be used to identify the caller.

For example, the PBX 240 or the call center controller 250 may receive notifications defined in the 3GPP TS 29.199-3 V6.3.0 specification, or the EDSI Parlay X 2.1 S-Part 3 Call Notification. These specifications are available at "http://docbox.etsi.org//TISPAN/Open/OSA/ParlayX21.html" and "http://www.3gpp.org/ftp/specs/archive/29_series/29.199-03/29199-03-630.zip", respectively. More specifically, the PBX 240 or the call center controller 250 may be configured to receive the "handleCalledNumberRequest" input message of the aforementioned Call Notification API, with "CallingParty" indicating the identifier of the inbound caller, and "CalledParty" indicating the dialed number when a new call is received. The PBX 240 and or the call center controller 250 may then influence the desired call routing by returning the following parameters in the output message "handleCalledNumberResponse": "ActionToPerform" set to "Route" and the "RoutingAddress" set to the address (e.g., the phone number or extension number) of a particular agent to whom the computer-telephony system 100 desires the call to be routed. The computer-telephony system 100 may alternately or additionally utilize other specific methods for call routing that are known in the art.

Data Used by the System

Figure 3:
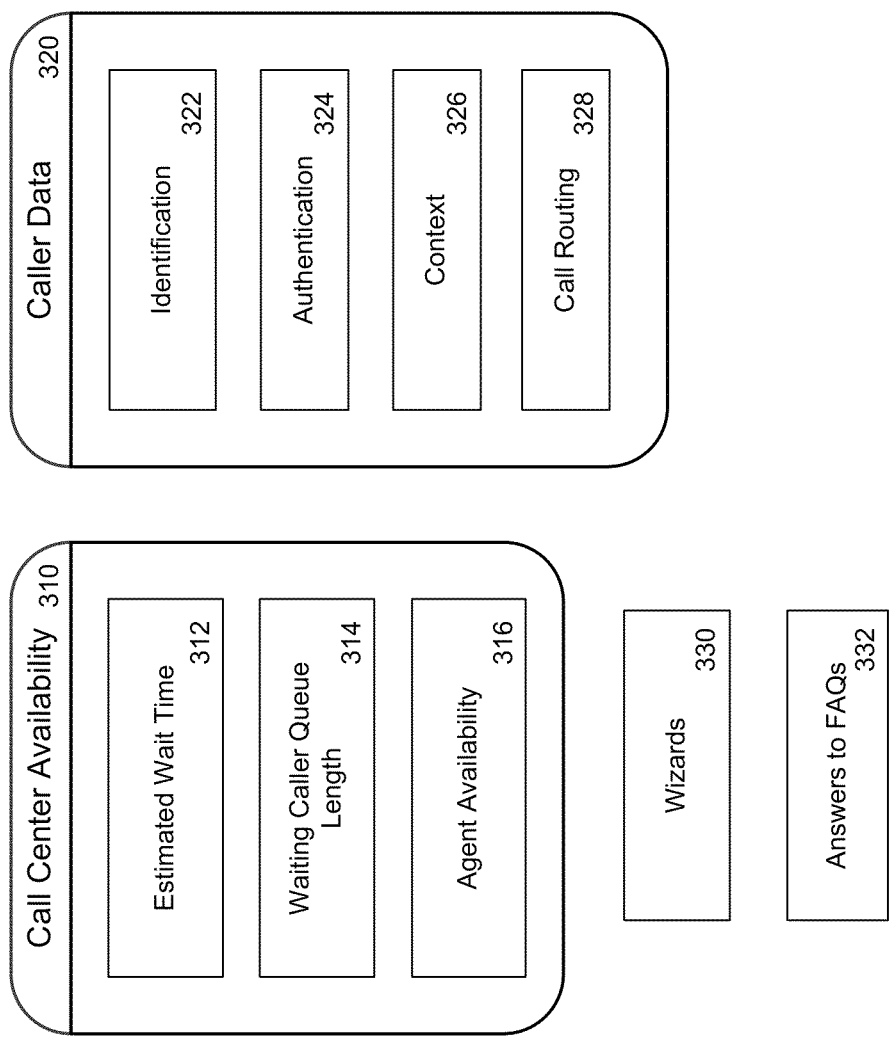
FIG. 3 illustrates data that is created, transmitted, stored, or utilized by the system.

FIG. 3 illustrates some types of data that the computer-telephony system 100 creates, transmits, stores, or otherwise utilizes. Call center availability data 310, including but not limited to, an estimated wait time datum 312, a waiting caller queue length datum 314, and an agent availability datum 316 contain information relating to the availability of a call center, such as the call center 244. In some embodiments, the agent availability datum 316 may be, for example, "true" if any one of agents 140 are available to take a call. Alternately, the agent availability datum 316 may refer to a particular agent or a particular group of multiple agents that are a subset of all agents 140. For example, if the agent availability datum 316 is "false," it may mean, that a particular agent who is the personal account manager of a particular customer (the customer having recently utilized the graphical user interface-based application 210) is not currently available to speak to the customer. In another example, the agent availability datum 316 indicates the number of agents who are available to take calls, rather than a Boolean ("true" or "false") status.

The waiting caller queue length datum 314 indicates the number of callers who are waiting to speak with an agent. In some embodiments of the computer-telephony system 100, a caller waiting in the queue may have yet to actually make a call, e.g., the waiting caller queue length datum 314 may include a user 112 who entered the queue by utilizing the graphical user interface-based application 210 or the call center widget 212.

The estimated wait time datum 312 estimates a time or a duration that a caller needs to wait in order to speak to an agent. For example, when the estimated wait time datum 312 indicates 15 minutes, a new caller entering the queue would need to wait 15 minutes to speak to an agent. In some embodiments, the estimated wait time datum 312 may be associated with a caller who is already waiting in the caller queue. The estimated wait time datum 312 may be an absolute time (i.e., one that does not vary along with the present time) or a relative time (e.g., one that is relative to the present time.) Examples of the estimated wait time datum 312 include, but are not limited to: 15 minutes from the present time, a "wall clock" time such as the string "5:02:30 AM", a date, a month, a year, a day of the week, a value formatted in accordance with the International Organization for Standardization (ISO) 8601 format, a number of seconds elapsed since epoch (i.e., midnight of Jan. 1, 1970, coordinated universal time) and the like.

Caller data 320 may be associated with a current, future, or past caller of a call center, and include a caller identification datum 322, a caller authentication datum 324, a caller context datum 326, and a call routing datum 328 relating to a caller. The identification datum 322 allows the computer telephony system 100 to identify a user (e.g., one of the users 110) or a device (e.g., one of the telecommunication devices 120.) The identification datum 322 may be any identifier of a caller or a telecommunications device, such as a Mobile Subscriber Integrated Services Digital Network Number ("MSISDN"), an International Mobile Equipment Identifier ("IMEI"), an International Mobile Subscriber Identity ("IMSI"), a globally unique identifier ("GUID"), an IP address (such as an IP version 4 or 6 address), and so on.

The authentication datum 324 represents security authentication status or information relating to a caller. For example, if authentication datum 324 equals "true," it may indicate to the system 100 that the caller has already passed a security authentication procedure (e.g., a user 112 may have entered a valid account number and password via the graphical user interface-based application 210, or may have utilized a fingerprint sensor, a retina scanner, etc., to otherwise validate the user's authenticity.) A variety of other methods known in the art for interacting with a graphical user interface-based application (e.g., 210) of a mobile device to provide security authentication may result in caller authentication datum 324 being "true." In some embodiments, the authentication datum 324 contains account or authentication details, for example, at least one or a combination of an account number, a password, a PIN number, a user name, a social security number, etc.

The caller context datum 326 contains any information at least partially describing the context, or the state of a user (e.g., one of the users 110) or a device (e.g., one of the telecommunication devices 120.)

The call routing datum 328 may contain a desired routing path with respect to the agents 140 and any virtual agents (such as may be implemented by the IVR component 108 to simulate speaking to a particular agent.) For example, a routing path may lead to certain agents who provide certain specialties or certain functions of a call center, which are not as efficiently provided by other agents (for example "technical support," "upgrades," "personal account manager for Bob Smith," etc.)

Wizards 330 and answers to frequently asked questions ("FAQs") 332 may provide to an end user (e.g., one of users 110), or in some cases to agents 140, steps to troubleshoot problems, find answers to questions, seek help, and so on. In some cases, the wizards 330 and the answers to FAQs 332 contain computer-executable instructions such as for one or more of the telecommunication devices 120, or the agent terminals 150. In some cases may contain text, digital pictures, menus, sound clips, other digital files or other resources.

Example Processes of the System

Some example processes using the system described above will now be provided. These are only examples and many other examples are of course possible. Further, based on such examples, one of ordinary skill in the art will appreciate general features of the present system to allow a mobile device to more effectively interact, e.g. with a call center or CTI equipment.

Figure 4:
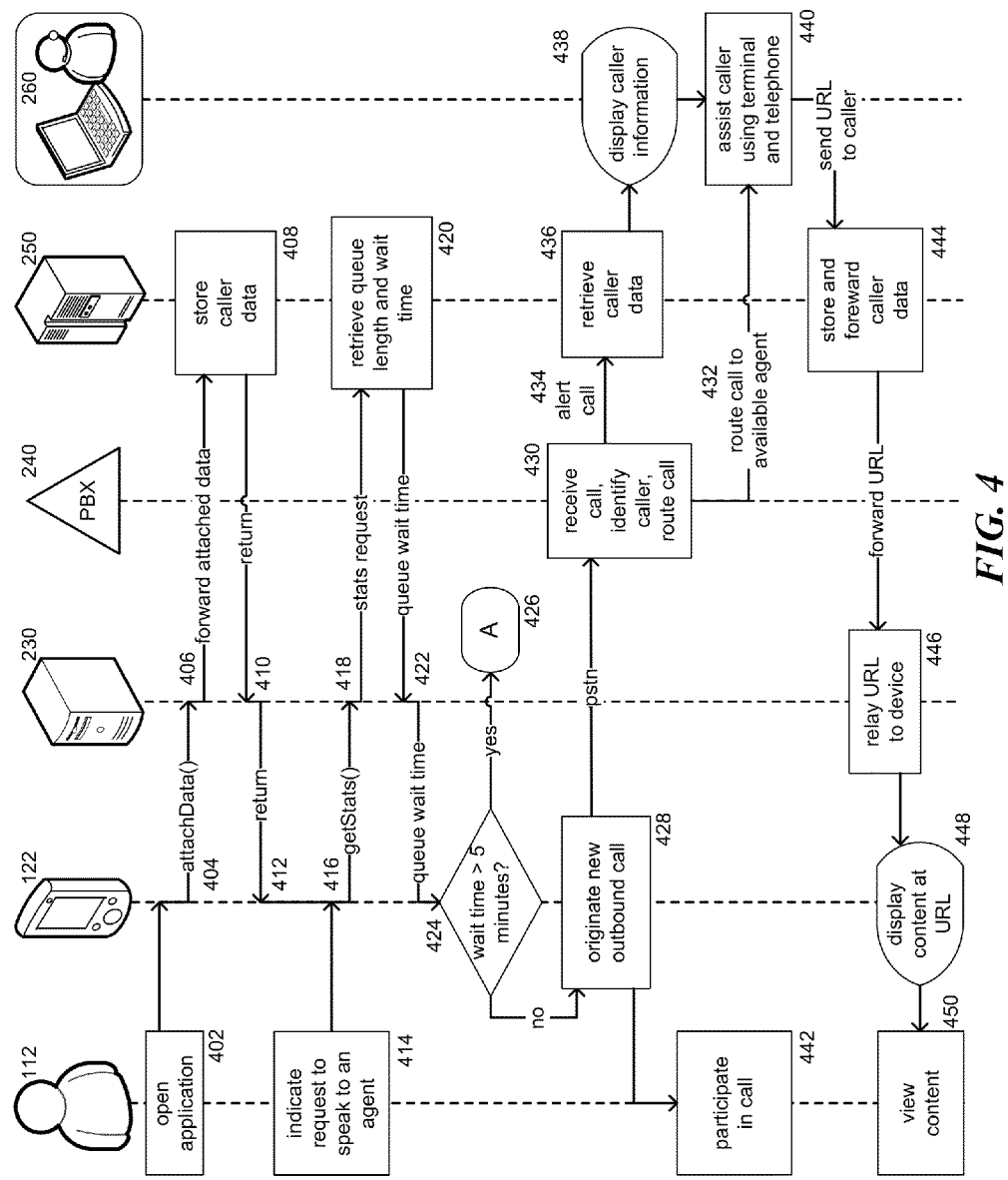
FIG. 4 is a process flow diagram illustrating a mobile device facilitating a user's interaction with a customer support agent by verifying agent availability prior to originating a phone call to a call center, and displaying web content that was pushed by the agent.

FIG. 4 is a process flow diagram illustrating a mobile device 122 facilitating the interaction of a user (e.g., the user 112) with a customer support agent at an agent station (e.g., agent station 260) by verifying agent availability prior to originating a phone call to a call center and displaying web content sent by the agent station. At step 402 the user 112 opens an application on the user's mobile device 122. In some cases the user may accomplish this by performing some action which indirectly opens the application. For example, a user may dial a phone number associated with a call center 244 which is intercepted (e.g., by the call intercept service 218) and redirected to a graphical user interface-based application (e.g., 210.) At step 404 the application forwards data to the system 100, typically via a data link. It may call the attached data function of the call center SDK 214 passing in caller identification data 322, such as the MSISDN of the user's 112 account; and other data that the application 210 desires to communicate to the system 100, such as context datum 326 indicating that the user has dialed a number or opened an application for the likely purpose of changing the user's wireless subscription plan. Any type of data stored on or accessible by the user or the mobile device may be attached and sent via the message.

The mobile care server 230 at step 406 receives the message (e.g., across data connection 220) and forwards it (e.g., via the computer-telephony connector 238 in combination with the computer-telephony interface 246) to the call center controller 250. In some embodiments the mobile care server 230 may store or process the data locally at the server, instead of or in addition to forwarding the attached data to the call center controller 250.

Proceeding to step 408, the call center controller 250 receives the attached caller data and stores it, then returns an acknowledgement to the mobile care server 230. The mobile care server 230 at step 410 forwards the return acknowledgement message to mobile device 122. The mobile device at step 412 receives the return acknowledgement and is aware that the system 100 successfully received the attached data.

The graphical user interface-based application 210 may display a menu option for speaking to an agent about upgraded calling plans. The user at step 414 indicates a request to speak to an agent, e.g., such as by selecting the menu option to speak to an agent visible on the graphical user interface 123. In some cases, the application 210 may determine that the user 112 indicates a request to speak to an agent tacitly, automatically, or implicitly, e.g., just by the opening of the application 402. At step 416 the application 210 may perform a "getStats" API call directed at call center SDK 214, passing in the parameter for obtaining the availability of the call center, such as the wait time for the caller queue (e.g., by passing in at least one of the parameters "_QUEUE_WAIT_TIME_", and "_CALL_CENTER_OPEN_"). The mobile care server 230 at step 418 receives a message resulting from the "getStats" API call and forwards it to the call center controller 250.

The call center controller 250 at step 420 receives the request for availability status of the call center and obtains data relating to the availability of the call center 310, such as the estimated wait time 312, or a Boolean value indicating "true" if the call center is open, etc. As needed, the call center controller 250 may communicate with the PBX 240 to determine the call center availability data 310. The call center controller 250 then sends the requested call center availability data 310 to the mobile care server 230, which the server receives and forwards at step 422. The mobile device 122, at step 424 receives the estimated wait time 312 for the call center 244 and performs a check for whether the estimated wait time is excessively long, e.g., longer than five minutes. Alternately or additionally, the mobile device can perform a decision based on a Boolean value regarding whether the call center is open.

If the wait time is excessively long, the process continues to step 426. Otherwise the process continues to step 428 where the mobile device 122 originates a new outbound call to a number for the call center 244. In this example, a PSTN may implement the voice connection 222. The private branch exchange of the call center 240 at step 430, receives the call (e.g., over the PSTN) from mobile device 122 and identifies the caller. The identification of the caller may be by the caller's MSISDN or the dialed number, etc., as previously detailed above in discussion of the PBX 240. The PBX 240 then routes the call to an available agent 432. In some cases, such as when the agent 432 is not yet available, the PBX may temporarily place the caller on hold or may temporarily route the caller to the voice browser 254, such as when the agent 432 is not yet available. An agent is expected to become available within any maximum period of time previously verified (e.g., the estimated wait time determined in step 424 to be no greater than five minutes.) Referring back to step 430, the PBX 220 also alerts the call center controller 250 about the call. The alert 434 may include the identification 322 of the caller in combination with an indication of an agent station 260 to which the PBX 240 routed the call.

At step 436, the call center controller 250 receives the alert, including the identity of the caller, and retrieves the caller data that was previously stored in step 408. The retrieved data may include the caller context datum 326 indicating that the user opened an application or dialed a number relating to changing the user's wireless subscription account (e.g., data that the call center controller 250 received and stored in step 408.) The call center controller 250 may also determine that the call associated with the alert 434 was routed to a particular agent station, e.g., agent station 260. The determination may be based on a call routing datum 328 contained in the alert 434, or based on direct communications with agent station 260 across communication link 262 to determine that the caller it is connected to matches the routed caller (e.g., based on caller identification datum 322 contained in the alert 434.) Also in step 436, the call center controller 250 then sends the retrieved information relating to the caller to the agent station 260. The agent station 260 at step 438 displays the caller information received from the call center controller 250. In some cases the agent station 260 may receive caller data and obtain additional information based on that data prior to displaying the caller information. The information may be displayed, e.g., on the agent's terminal 152.

At step 440, the agent 142 utilizes the caller information displayed in step 438 to assist the caller whose call was routed in step 432 to the agent's telephone. The agent may determine that the caller would like additional information about a particular calling plan, which is available on a Web page at a particular uniform resource locator ("URL"). The agent may decide to send the webpage to the caller by utilizing a CRM software application on the agent's terminal 152 to send the webpage to the caller. At this point the agent 142 or the user 112 may decide to conclude the voice call, or may alternately continue the voice call.

The call center controller 250 at step 444 may receive an instruction from the agent's terminal 152 to forward the webpage to the caller. The call center controller 250 may store this instruction for future reference by the computer telephony system 100, for example, for future reference by the CRM software of one of the terminals 150 used by agents 140 who may assist the caller in the future. The call center controller 250 sends the caller data including the URL to the mobile care server 230. The URL may be stored as a caller context data entry 326 and may be associated with a caller identification datum 322, which the system 100 may use to forward the URL to correct mobile device 122 of the caller. The mobile care server 230 at step 446 receives the URL and the identification of the caller with which it is associated, and forwards it via the data connection 220 to the mobile device 122. The mobile device at step 448 receives the URL and may display Web content associated with it. The user 112 at step 450 then may views the displayed Web content.

Call Scheduling

Figure 5:
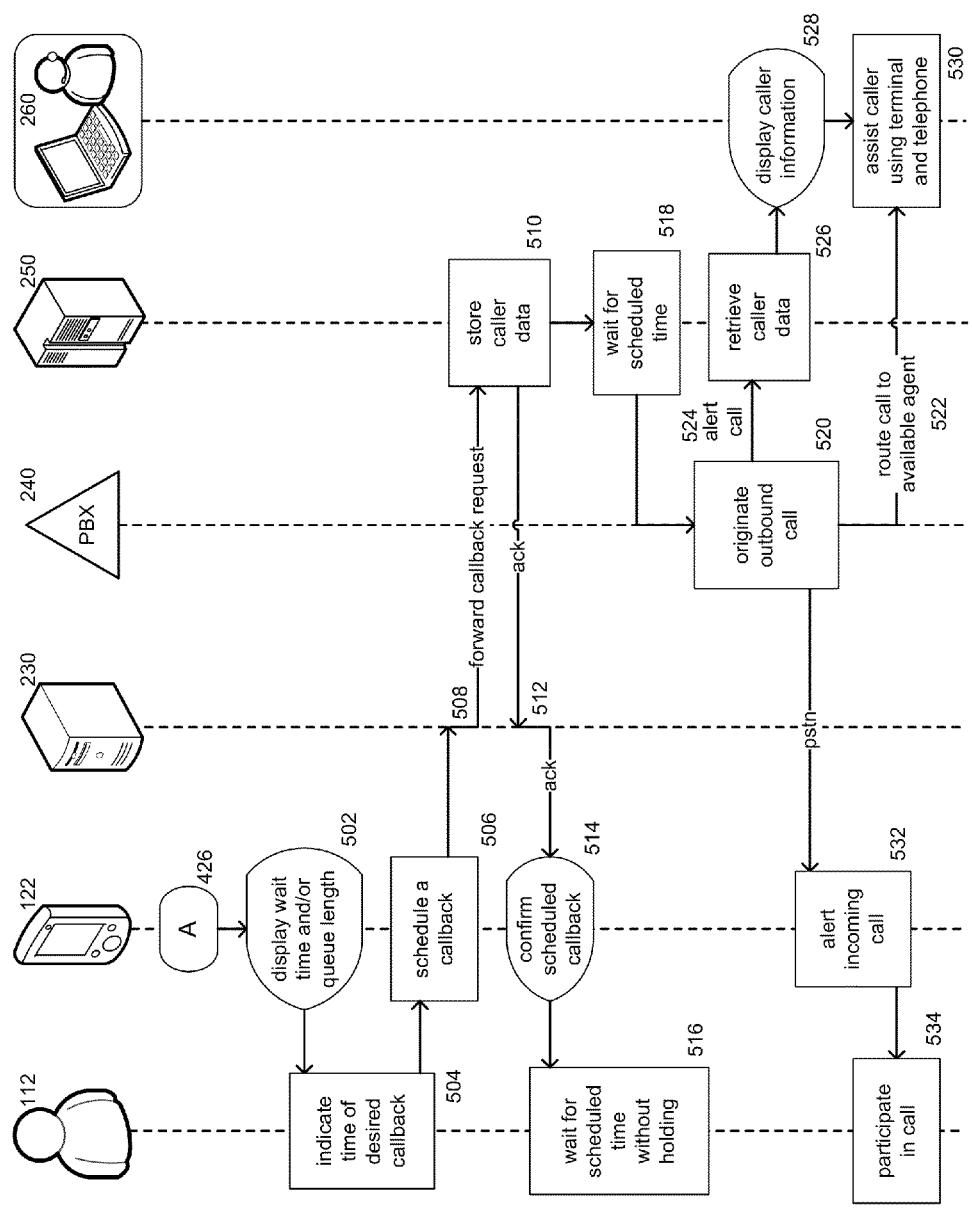
FIG. 5 is the process flow diagram of FIG. 4, detailing callback scheduling that can occur when waiting times to speak to a call center agent are long.

FIG. 5 adds additional detail to the process flow diagram of FIG. 4, detailing an example of call scheduling that can occur, e.g., when the estimated waiting times to speak to a call center agent are too long. The process flow of FIG. 4 continues from step 426, where the mobile device 122 has determined that the wait time is long. At step 502, the mobile device 122 then displays the wait time (or alternately, the number of callers already waiting in the queue to speak to a call center agent.) At step 504, the user 112 observes the wait time for the call center on the graphical user interface 123, and indicates on the user interface a desired time to receive a call from an agent. The indication may be a selection of a displayed menu item (e.g., on a display or touchscreen panel), a recognition of a voice command uttered by the user 112 that is locally processed on mobile device 122, the pressing of one or more buttons on the mobile device 122, or other method known in the art for locally interacting with a mobile device.

At step 506, the mobile device 122 receives the indication and schedules an incoming call appointment ("callback") with the call center 244. The device 122 requests callback scheduling by sending a message to the mobile care server 230 over the data connection 220. An application 210 on the mobile device 122 may utilize the call center widget 212 or the call center SDK 214 to perform the steps of scheduling a callback 506, and in some cases, displaying the call center availability 502 (e.g., the application 210 may perform the "requestCallBack" API call of the call center SDK 214). At step 508, the mobile care server 230 receives the callback request and forwards it to the call center controller 250. The callback request may be formatted as a data structure comprising a caller identification entry 322 and a caller context entry 326. In some embodiments, a callback request may additionally include a call routing entry 328, indicating a particular agent (or group of agents) at the call center 140 with whom the user desires to speak. For example, the user 112 may desire to speak with a member of the "upgrades" team of agents regarding changing the user's calling plan.

The call center controller 250 at step 510 receives the callback request and stores the caller data. If the call center controller 250 determines that it cannot likely call the user back at the requested time, it may reply to the callback request with updated call center availability data 310, such as updated estimated wait time 312. The controller may enqueue the caller, schedule an alert at a specified time, or perform other steps known in the art to have a call center originate an outbound call to a user at a designated time (for example, such as by using Genesys Virtual Hold software or Cisco Intelligent Contact Management software). When the mobile care server 230 receives an acknowledgement regarding the callback request from the call center controller 250, the server forwards the acknowledgement to the mobile device 122. Upon receiving the acknowledgement, the mobile device 122 may display to the user that the callback is successfully scheduled, 514, or may update its display with updated times for which the call center will allow scheduling a callback. For example, if the acknowledgement received at step 514 indicates an updated estimated wait time 312, the mobile device application 210 may go back to step 502, to invite user 112 to indicate a new time of desired callback.

When the user in step 516 observes on mobile device 122 that a callback was successfully scheduled for a particular time, the user may wait until that time without the inconvenience of waiting on hold and also without needlessly utilizing limited bandwidth of a wireless telecommunication network (e.g., underlying the voice connection 222). Moreover, with the exemplary process of FIGS. 4-5, the system 100 has not necessitated that the user 112 interact with the IVR component 108 for an extended period of time.

While the user is waiting in step 516, the call center controller 250 also waits (518) either until the user's position in the queue comes to (or close to) the front of the queue, or for a scheduled time to perform an action relating to calling the user (e.g., enqueueing the user into a high priority queue, sending an alert to the PBX 240 to immediately originate an outbound call to user 520, and so on.) At step 520, the PBX 240 originates an outbound call, via a PSTN, to the mobile device 122. The PBX 240 may also send an alert about the originated call 524 to the call center controller 250. It may also route the originated call to an available agent 522. The alert 524 may, similarly to the alert 434, contain call routing information 328 and/or caller identification data 322.

The steps 526, 528, and 530 may proceed similarly to the previously described steps 436, 438, and 440, respectively. Proceeding to step 532, the mobile device 122 receives an alert of an incoming call via the PSTN. The mobile device 122 may then alert the user 112 of the incoming call, such as by playing a ring tone, vibrating, flashing its display, and so on. The user 112 may then answer the call and participate in the call with the agent (block 534). Referring to FIG. 4, the steps of 444 through 450 (delivering Web content from the agent station 260 to the user 112) may take place subsequent to step 530, even though they are omitted from FIG. 5.

Therefore, in the exemplary workflow of FIG. 5, the user 112 is therefore able to locally schedule an appointment to speak to an available agent at a time that is likely to be convenient for the user 112, as well as equitable to other users who were previously waiting in the caller queue.

Moreover, in the process flow of FIGS. 4-5, the system 100 has reduced or eliminated needless and potentially frustrating interactions with the IVR component 108, waiting while holding, and excessive utilization of telecommunication networks (e.g., a wireless telecommunication network and/or a PSTN underlying voice connection 222.) Other benefits are also provided, though not mentioned here for reasons of brevity.

On-Device Authentication

Figure 6:
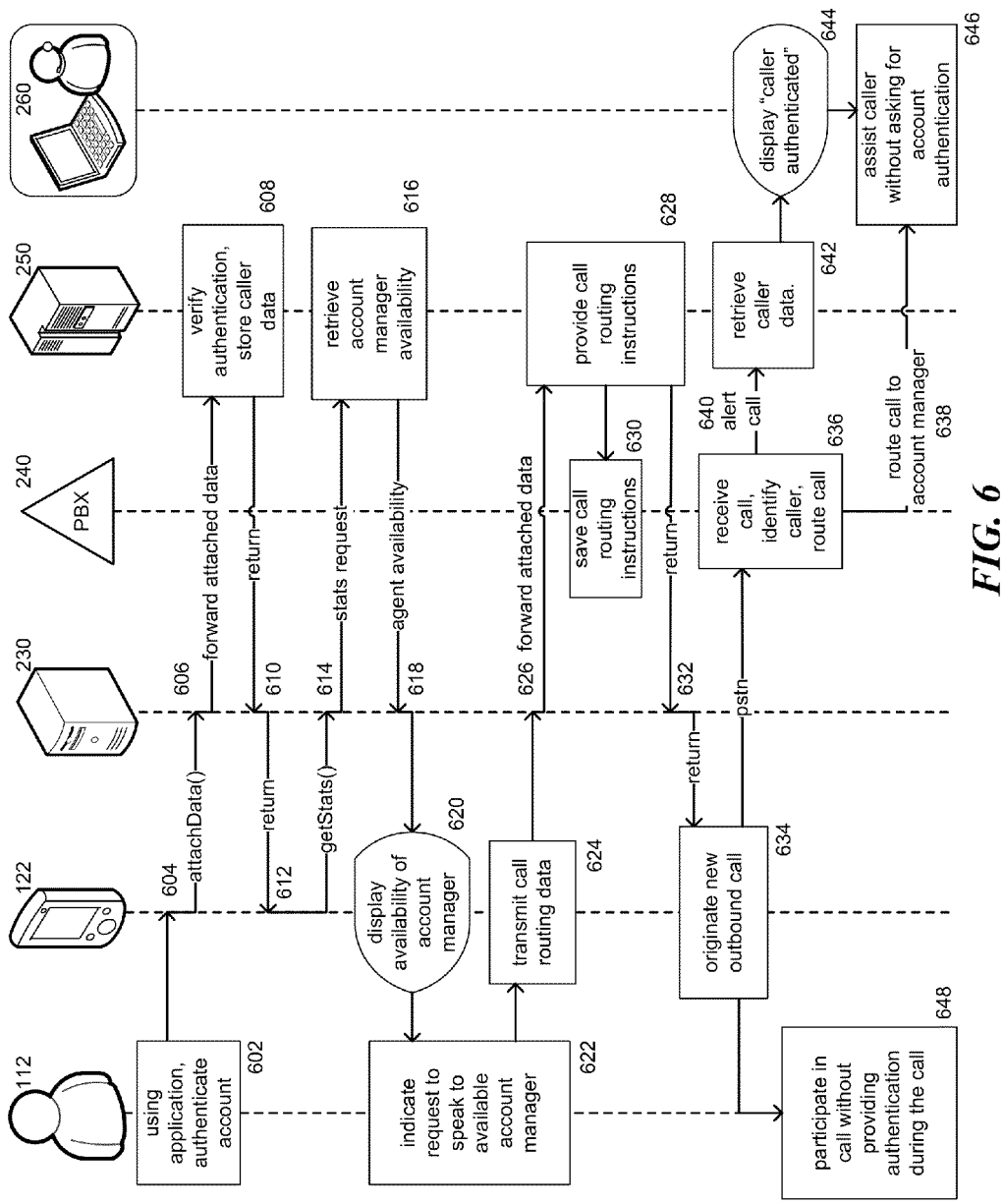
FIG. 6 is a process flow chart in which the system accepts user authentication at the device rather than through a call center agent, and facilitates the user receiving assistance from the user's personal account manager when availability allows.

FIG. 6 is a process flowchart in which the system 100 accepts user authentication at the device 122, rather than through a call center agent and, when availability allows, facilitates the user 112 receiving assistance from the user's personal account manager 142. Beginning at step 602, the user 112 uses a mobile device application (for example, the graphical user interface-based application 210) to authenticate the user's account. For example, the account may be a bank account and the application may be related to the user's bank. The authentication may consist of entering an account number, entering a pass code or password or PIN number, and so on. At step 604 the application 210 running on the device 122 receives the authentication details from the user 112, encrypts the authentication information where appropriate and sends the authentication information to the mobile care server 230, e.g., by using the attached data API call of the call center SDK 123.

The data connection 220 transmits the attached data to the mobile care server 230, where it is received by the server in step 606. Not shown in the diagram, the mobile care server 230 may optionally forward the authentication data for verification of its authenticity to the backend system 234 via the communication link 232. Upon receiving verification of authenticity from backend system 234 in response, the mobile care server 230 may forward the caller authentication data 324 along with the caller identification data 322 to the call center controller 250. The controller in step 408 receives the attached data and stores it. In some embodiments, e.g., where the authenticity is not yet verified, the call center controller 250 verifies the authenticity of the authentication caller data 324 at this time. The controller then returns confirmation of the received caller data 320 (and in some cases, results of any verification of the authentication data 324) to the mobile care server 230. At step 410, the mobile care server 230 receives confirmation from the call center controller 250, and forwards confirmation onto the mobile device 122. At step 612, the mobile device 122 receives verification of the attached data. In some embodiments, the application on the mobile device 210 may then display via the graphical user interface 123 that the user has been successfully authenticated.

As also shown in step 612, the application 210 may perform a "getStats" API call of the call center SDK 214 in order to determine if the user's 112 personal account manager is available, (e.g., by specifying the API parameter "_PERSONAL_ACCOUNT_MANAGER_AVAILABLE_".) In some embodiments, this action may occur automatically without additional user input, e.g., if the user was successfully authenticated. At step 614, the mobile care server 230 receives a message resulting from the "getStats" request and forwards it to the call center controller 250. At step 616, the call center controller 250 receives the request and determines, as necessary, which one of the agents 140 is the user's personal account manager (such as by consulting a database of personal account managers, based on a caller identification entry 322 or a caller authentication entry 324, which could contain an account number that is referenced in the database). The call center controller 250 may retrieve, receive, or generate an agent availability datum 316 and send it to mobile care server 230. In step 618, the mobile care server 230 receives the agent availability and forwards it to the mobile device 122. In step 620, the mobile device 122 receives the agent availability from the mobile care server 230 and displays via its graphical user interface 123 the availability of the user's 112 personal account manager. If the personal account manager is currently available, the display may include providing a menu option for the user 112 to speak to the user's personal account manager.

At step 622 the user 112 sees and selects the menu option to speak to the personal account manager. Proceeding to step 624, the mobile device 122 transmits call routing data. This may be initiated by the graphical user interface-based application 210 calling the "requestTransferDNIS" function of the call center SDK 214, passing in an identifier of the party with whom voice communications is desired (e.g., the extension number for the user's 112 personal account manager.) The call center SDK 214 then transmits a call routing datum 328 (and in some embodiments a caller identification datum 328) to the mobile care server 230. At step 626, the mobile care server 230 receives the data and forwards it to the call center controller 250. In some embodiments, the mobile care server additionally determines and provides with the call routing datum a caller identification datum 322. At step 628, the call center controller 250 receives the call routing datum 328 and caller identification datum 322, and provides call routing instructions to the PBX 240, such as via communication link 258. At step 630, the PBX 240 saves the received call routing instructions. In one embodiment, the call routing instructions may instruct the PBX 240 regarding how it should respond to "handleCalledNumberRequest" messages that it may receive (discussed in greater detail above.) Referring back to step 628, after successfully instructing the PBX 240 with the call routing instructions, the call center controller 250 returns a successful acknowledgement to the mobile care server 230. In step 632, the mobile care server 230 receives the returned acknowledgement and relays it to the mobile device 122 via the data connection 220. At step 634, the mobile device 122 receives a successful confirmation that the system 100 is ready to specially (e.g., personally) route a voice call.

In response to receiving the successful confirmation, the mobile device 122 may then originate a new outbound voice call e.g., via a PSTN to the PBX 240. Proceeding to step 636, the PBX 240 receives the call, identifies the caller and routes the call as per the call routing instructions previously saved in step 630. The PBX 240 may route 638 the call to the personal account manager, and may provide an alert 640 to the call center controller 250. In step 642, similar to the previously described steps 436 and 526, the call center controller 250 receives the previously saved caller data 320 (e.g., the caller authentication datum 324 stored during step 408), determines an agent station 260 routed by step 432, (e.g., the agent station of the caller's personal account manager,) and sends information based on the retrieved caller data to the agent station 260. In step 644, the agent station 260 of the user's personal account manager receives the caller authentication datum 324, which indicates that the caller 112 is authenticated and displays "caller authenticated" on the agent's terminal 152.

Proceeding to step 646, the agent 142, who is the personal account manager of the user 112, answers the call routed to the agent's station 260, views the displayed "caller authenticated" message on the terminal 152, and is able to assist the caller personally (e.g., by performing a financial transaction in the caller's bank account) without asking for account authentication. In some embodiments, the caller authentication datum 324 may be modified during a step to remove confidential information (such as to not allow an agent 142 to see an authenticated caller's social security number that the caller could have provided for authentication, e.g., in step 602.) The caller 112 joins in the call at step 646 and interacts with the caller's personal account manager without needing to provide authentication during the call.

Example Data Structures

FIG. 7 contains example data structures 710-770 that associate caller identification data 322, caller authentication data 324, caller context data 326, and call routing data 328, which may be used in the computer-telephony system 100. Although only seven example data structures are shown, a person with ordinary skill in the art will appreciate that many other specific examples, as well as combinations of the data types are possible.

The data structure 710 associates a caller identification datum 712 with a call routing datum 718 (e.g., it could associate the MSISDN "206-555-1212" with a desired routing destination of an "Upgrades" group or team of customer service agents). The system 100 may use the data structure 710 to indicated desired future call routing behavior for a future call (e.g., as in the process steps 624, 626, 628, and so on). The system 100 may also use this 710 or a similar data structure when sending an alert or a notification about how a call has been routed (e.g., 434, 436, 524, 526, 640, 642, and so on). In one embodiment, the call routing datum 718 provides instructions to route the user to an IVR component that presents the user with a computerized voice menu that relates to product or service upgrades (e.g., present the user with options for upgrading the user's mobile subscription service.)

The data structure 720 contains the same information as the data structure 710 as well as the caller context datum 726. In this example, the caller context entry "Callback requested at: 8:34 PM" indicates when a callback is requested. Since a day is not specified, the callback time may be interpreted to mean on the same day. The presence of the call routing datum 718 may indicate desired call routing instructions for the system 100 to perform when carrying out the callback (e.g., possibly at steps 518, 520, etc).

The data structure 730 contains the caller identification datum 712 and a caller context entry 736, which contains a URL. The system may utilize this data structure 730, for example, when pushing Web content to a user, e.g., during one or more of the steps 440, 444, 446, and 448.

The data structure 740 contains a caller identification datum 742 representing an IMEI that specifies a particular mobile device (such as a particular mobile phone supporting GSM communications), and a caller authentication datum 744 indicating an account number, as well as an additional status that the password for the account has been verified. The system may utilize this data structure 740, for example, in one or more of steps 604, 606, 608, 610, 612, 642, 644, 646, and so on.

The data structure 750 contains the information of the data structure 740 additionally combined with a call routing entry 758. The call routing entry 758 by a text string "x208" indicates a routing destination of a particular call center agent at a phone extension number 208. The system may utilize this data structure 740 for example in one or more of steps 640 and 642 (e.g., in order to display "caller authenticated" on the terminal of the call center agent associated with extension 208), or in steps 624, 626, 628 (if those steps were, in addition to providing call routing instructions, altered so that they also provided caller authentication information.)

The data structure 760 contains the caller identification datum 742, a caller authentication datum 764 (indicating that authentication verification has not yet been completed, i.e., authentication is required for the known account number "95841321", which may be the number of a bank account, a loan account, a customer service account number, etc), caller context entry 766 (indicating that a user unsuccessfully attempted to make a purchase of a product due to an associated credit card being expired), and a call routing datum 768 (indicating call routing instructions to route the caller, e.g., to either one of the agents associated with extensions 208 or 209; or to extension 208 if available, otherwise to extension 209 if 208 is not available, etc.) This data structure may be passed to the system or between components of the system after a user has unsuccessfully made an attempt to purchase a product using a mobile device. The call routing entry 768 may refer to call center agents who are preferred by the user, or preferred by the system for dealing with soliciting credit card renewal information, etc.

The data structure 770 contains a call identification datum 772 (with an Internet Protocol, Version 6 address in this example), a caller context entry 776, and a call routing entry 778. The context entry 776 may indicate that the caller's mobile device has experienced an unplanned failure, with information relating to the failure, and the call routing entry 778 indicates a desired call routing behavior relating to the "Technical Support" department. A mobile device may automatically send this data structure to the system 100, for example, when the caller experiences a hardware malfunction in order to facilitate the caller receiving knowledgeable assistance from a technical support representative.

Widgets and User Interface Examples

FIGS. 8-12 contain example user interfaces for allowing the user of a mobile device to interact with a computer telephony system 100, as well as widgets that are configurable by an application developer to easily produce the user interface examples.

FIG. 8 contains examples of a user interface display 810 and a related widget 820 that allow a user to select from various groups of agents at a call center, which the opening of an application process step 402 may display.

Figure 9:
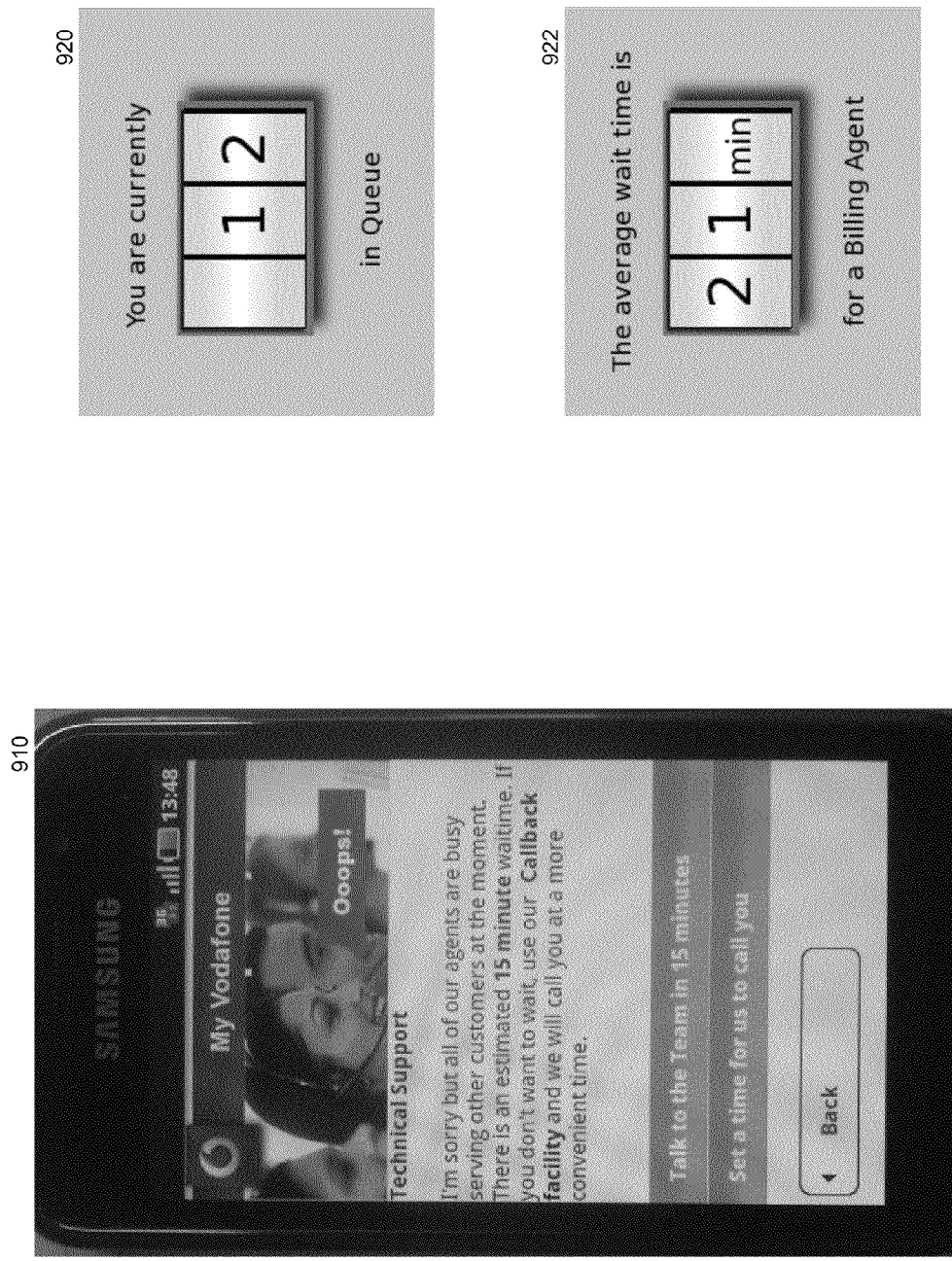
FIG. 9 contains examples of a user interface display and a related widget that allow a mobile device to inform a user about an estimated wait time or queue length.

FIG. 9 contains examples of a user interface display 910 and a related widget 920, 922 that allow a mobile device to inform a user about an estimated wait time or queue length, which process step 502 may display. The widget may be configured to display either a queue length 920 or an estimated wait time 922.

FIG. 10 contains examples of a user interface display 1010 and a related widget 1020 that allow a user of a mobile device to schedule a time to receive a call from an agent at a call center, and which callback time indication and scheduling process steps 504 and 506 may display.

FIG. 11 contains examples of a user interface display 1110 and a related widget 1120 that confirms a time that is scheduled for receiving a call from an agent of a call center, which process step 514 may display.

Figure 12:
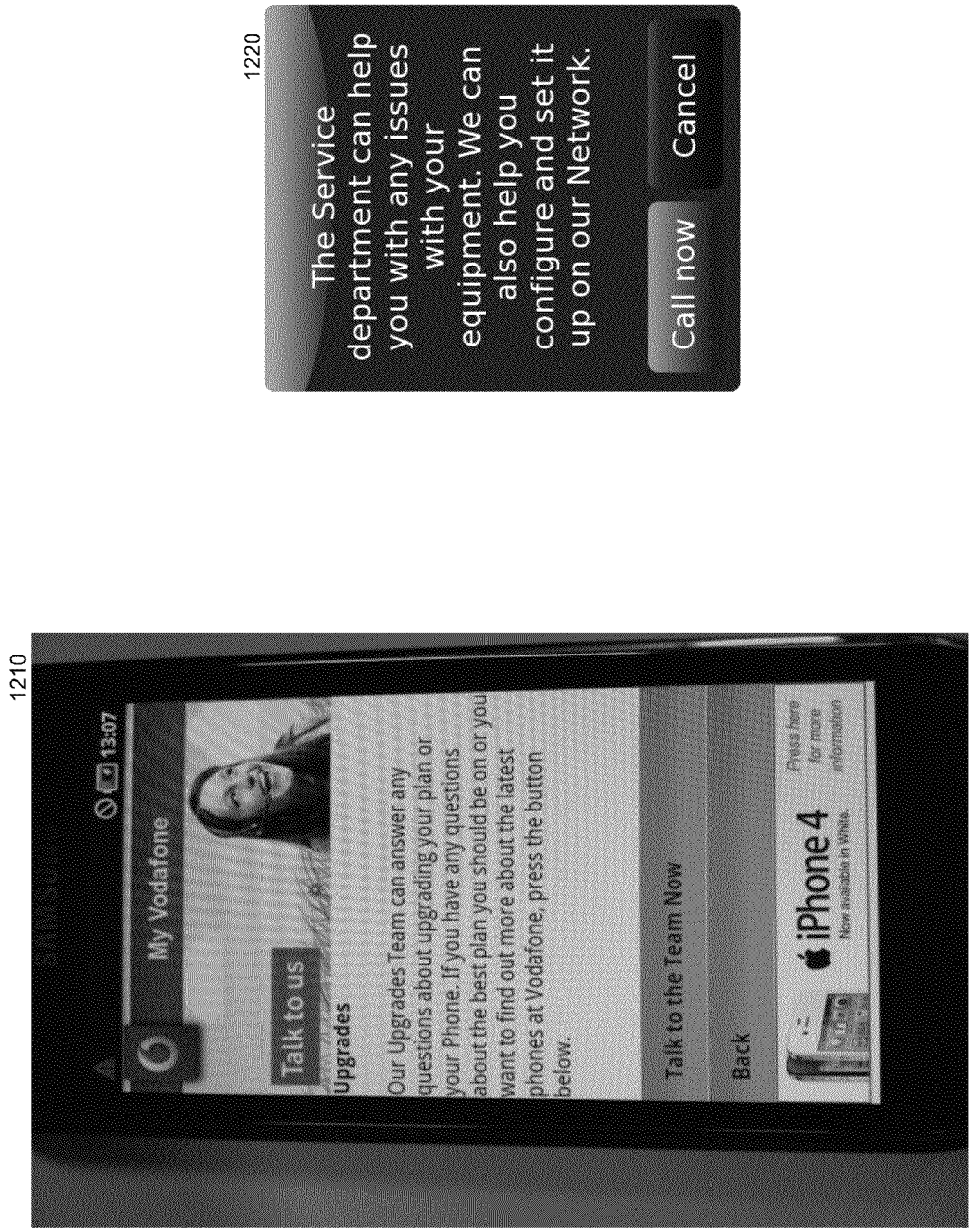
FIG. 12 contains examples of a user interface display and a related widget that provides the user with a menu option for performing a call to a currently available agent or group of agents.

FIG. 12 contains examples of a user interface display 1210 and a related widget 1220 that provides the user with a menu option for originating a call to a currently available agent or group of agents, which process step 620 may display.

CONCLUSION

Note that "call center" as referred to herein may be a logical rather than a physical entity. For example, the agents, servers, or other components of the systems logically comprising the call center may not be physically located in one particular location, but may be distributed across multiple locations. In some cases, the servers and components may be arranged differently than are indicated above. Single components disclosed herein may be implemented as multiple components, or some functions indicated to be performed by a certain component of the system may be performed by another component of the system. Furthermore, different components may be combined (such as the mobile care server 230 and the computer-telephony controller 250, thereby eliminating the computer-telephony connector 238 and interface 246). In various embodiments, components on the same machine may communicate between different threads, or on the same thread, via inter-process communication or intra-process communication, including in some cases such as by marshalling the communications across one process to another (including from one machine to another), and so on.

Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM or flash semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A computer-telephony system comprising:
at least one processor;
data storage coupled to the at least one processor;
an integrated voice response (IVR) component, at least partially executed by the at least one processor, and configured to receive a call from a mobile device associated with a user,
wherein the call is associated with:
a question or request of the user, and
information identifying one or more mobile device context datums; and
a call intercept component, at least partially executed by the at least one processor, configured to:
determine, based at least in part on the one or more context datums, data stored in the data storage likely to assist in providing a response to the user's question or request, and
provide the data, over a data connection, to the user's mobile device.

2. The system of claim 1 further comprising:
a queue management component, at least partially executed by the at least one processor, configured to provide information to the user's mobile device regarding a status with respect to a queue of voice calls received by the IVR component.

3. The system of claim 1 further comprising:
a queue management component, at least partially executed by the at least one processor, configured to provide information to the user's mobile device regarding a status with respect to a queue of voice calls received by the IVR component;
wherein the queue management component provides wait time data to the mobile device.

4. The system of claim 1 further comprising:
a queue management component, at least partially executed by the at least one processor, configured to:
provide information to the user's mobile device regarding a status with respect to a queue of voice calls received by the IVR component;
designate the user a place in the queue without requiring the user to maintain a voice call connection with the IVR; and
establish a callback for the user when the user is near the front of the queue.

5. The system of claim 1, wherein the data stored in the data storage likely to assist in providing a response to the user's question or request is provided to a call center terminal before connecting the voice call to a call center agent.

6. The system of claim 1, wherein the computer-telephony system receives the one or more context datums prior to the mobile device establishing a voice connection with the computer-telephony system.

7. The system of claim 1, wherein the data storage stores at least one of:
an answer to a frequently asked question,
a wizard, and
the user's cell phone account data.

8. The system of claim 1, wherein the one or more context datums comprises one or more of:
an indication that the user has dialed a particular number;
an indication that the user has opened a particular application;
an indication that the user is interested in changing a wireless subscription plan;
user identification information;
user authentication information;
a recently used menu item;
purchase information; and
device failure information.

9. The system of claim 1, wherein the one or more context datums are provided to the computer-telephony system from the mobile device via a data channel connection.

10. A computer-readable medium, excluding a transitory propagating signal, storing instructions that, when executed by a computing device, cause the computing device to perform operations for determining the context of a caller, the operations comprising:
receiving, via a data channel, one or more context datum associated with a mobile device;
generating or modifying, based at least in part on the one or more context datums, an entry associated with a caller in a call center storage;
receiving, after generating or modifying the entry, an incoming voice call from the caller;
determining an identification of the caller;
matching the identification of the caller to the entry in the call center storage; and
providing the one or more context datums associated with the entry to an interactive voice response system or an agent at the call center who answers the voice call.

11. The computer readable medium of claim 10, wherein:
the one or more context datums provide an indication that the user of the mobile phone has entered account authentication information into the mobile device; and
as a result of the authentication information being associated with the call from the caller, the interactive voice response system or the agent at the call center refrains from, during the voice call with the caller, prompting the caller to enter the account authentication information.

12. The computer readable medium of claim 10, wherein the one or more context datums comprise one or more of:
an indication that the user has dialed a particular number;
an indication that the user has opened a particular application;
an indication that the user is interested in changing a wireless subscription plan;
a recently used menu item;
purchase information; and
device failure information.

13. The computer readable medium of claim 10, wherein the one or more context datums are an indication of a failed product purchase attempt.

14. The computer readable medium of claim 10,
wherein the one or more context datums provide indication that a failed product purchase attempt was due to a billing problem; and
wherein the interactive voice response system or an agent to which the voice call is routed is selected to respond to the product purchase attempt failure due to the billing problem.

15. A method for scheduling a call from a mobile device to a call center, the method comprising:
sending, via a data communication channel, to a server associated with the call center, a request for availability of one or more agents or groups of agents;
receiving, prior to establishing a voice call with the call center, an indication of availability of the one or more agents or groups of agents;
displaying an interface,
wherein the interface is configured to display one or more call center options relating to the received availability of the one or more agents or groups of agents; and
receiving a user selection, via the interface, of whether to contact the call center.

16. The method of claim 15,
wherein the user selection indicates not to contact the call center;
wherein the method further comprises receiving a further user input indicating a desired callback and transmitting a callback request to the call center; and
wherein the call center schedules a callback to the mobile device based on the transmitted callback request.

17. The method of claim 15, wherein if none of the one or more agents or groups of agents at the call center is available, the indication of availability of the one or more agents or groups of agents comprises either:
an estimated duration after which an agent, among agents at the call center, is anticipated to become available, or
the length of a queue of callers already waiting to speak to the agent.

18. The method of claim 15, wherein the one or more agents or group of agents at the call center comprises all the agents who are currently on duty at the call center.

19. The method of claim 15, wherein the request for availability of one or more agents or groups of agents includes an identification of the user of the mobile device, and
wherein the one or more agents or groups of agents comprises a specific agent assigned to work with the user, wherein the indication of availability of one or more agents or groups of agents includes an indication of the availability of the specific agent, determined based on the identification of the user.

20. The method of claim 15, wherein the request for availability of one or more agents or groups of agents includes an identification of the user of the mobile device;
wherein the agents or group of agents comprises a specific agent assigned to work with the user, wherein the indication of availability of one or more agents or groups of agents includes an indication of the availability of the specific agent, determined based on the identification of the user; and
wherein the user is a customer of a bank, wherein the call center includes agents working for the bank who are personal bankers, wherein the specific agent is a personal banker assigned to work with the customer, and wherein the user uses the input device to navigate to an application for the bank before seeing the availability of the user's personal banker.

* * * * *